(12) United States Patent
Hartmann

(10) Patent No.: US 7,856,724 B2
(45) Date of Patent: Dec. 28, 2010

(54) ELECTRICAL POWER TOOL WITH A ROTATABLE WORKING TOOL

(75) Inventor: Markus Hartmann, Mauerstetten (DE)

(73) Assignee: Hilti Aktiengesellschaft, Schaan (LI)

( * ) Notice: Subject to any disclaimer, the term of this patent is extended or adjusted under 35 U.S.C. 154(b) by 1696 days.

(21) Appl. No.: 10/653,643

(22) Filed: Sep. 2, 2003

(65) Prior Publication Data

US 2004/0103544 A1 Jun. 3, 2004

Related U.S. Application Data

(63) Continuation-in-part of application No. 09/928,773, filed on Aug. 13, 2001, now abandoned.

(30) Foreign Application Priority Data

Aug. 17, 2000 (DE) ................... 100 40 332

(51) Int. Cl.
  *B23D 45/16* (2006.01)
  *B27B 5/38* (2006.01)
  *B27B 9/00* (2006.01)
(52) U.S. Cl. ............................ 30/388; 30/277.4; 83/68; 83/666; 83/698.41; 125/13.01; 188/74; 451/342
(58) Field of Classification Search .................. 30/277.4, 30/381, 388; 83/665, 666, 676, 698.41, 58, 83/68; 451/342; 125/12, 13.01; 188/67, 188/68, 74, 77 R, 77 W
See application file for complete search history.

(56) References Cited

U.S. PATENT DOCUMENTS

| | | | | |
|---|---|---|---|---|
| 4,597,227 A | * | 7/1986 | Gentischer et al. | .......... 451/342 |
| 4,779,382 A | * | 10/1988 | Rudolf et al. | ............... 451/342 |
| 4,989,374 A | * | 2/1991 | Rudolf et al. | ............... 451/342 |
| 5,094,000 A | * | 3/1992 | Becht et al. | ................... 30/475 |
| 5,157,873 A | * | 10/1992 | Rudolf et al. | ............... 451/342 |
| 5,601,483 A | * | 2/1997 | Rudolf et al. | ............... 451/359 |
| 6,910,694 B2 | * | 6/2005 | Hartmann et al. | ........... 279/141 |
| 2002/0020068 A1 | * | 2/2002 | Hartmann | ..................... 30/388 |
| 2002/0020264 A1 | * | 2/2002 | Hartmann | ...................... 83/58 |
| 2002/0170408 A1 | * | 11/2002 | Hartmann et al. | ............. 83/666 |
| 2005/0092149 A1 | * | 5/2005 | Hartmann | ...................... 83/58 |

* cited by examiner

Primary Examiner—Clark F. Dexter
(74) Attorney, Agent, or Firm—Abelman, Frayne & Schwab

(57) ABSTRACT

An electrical power tool includes a locking device (31) for securing the working tool (3) on a motor-driven shaft (2; 200), a device (10) for braking the shaft (2), a safety element (8) connected with the braking device (10) and an actuation switch (7) and having a safety position that corresponds to the braking position of the braking device (10) and a non-actuation position of the switch (7) in which the switch (7) cannot turn the shaft-driving motor (M) on, and a release position that corresponds to the release position of the braking device (10) and an actuation position of the switch (7), and a locking mechanism (21) operatively connected with the safety element (8) and the locking device (31) and displaceable between a locking position which corresponds to an unlocking position of locking device (31) and in which the safety element (8) is retained in its safety position, and a release position in which the locking device (31) is in its locking position, and the safety element (8) occupies its release position.

8 Claims, 5 Drawing Sheets

ELECTRICAL POWER TOOL WITH A ROTATABLE WORKING TOOL

RELATED APPLICATIONS

This application is a continuation-in-part of application Ser. No. 09/928,773 filed Aug. 13, 2001, now abandoned.

BACKGROUND OF THE INVENTION

1. Field of the Invention

The present invention relates to an electric power tool including a motor-driven shaft for supporting a circular working tool, a locking device for securing the working tool on the shaft, a switch for turning a shaft driving motor on and off a braking device for braking the shaft or the working tool, a safety element having a safety position, in which it actuates the braking device and prevents turning-on of the shaft driving motor, and a release position, in which it deactuates the braking device and provides for turning-on of the shaft driving motor, with the braking device being mechanically connected with the safety element.

2. Description of the Prior Art

An electric power tool of the above-described type includes a coupling connecting the switch with the safety element for preventing an inadvertent actuation of the tool. The braking device serves for rapid braking of the working tool (working shaft) and/or the motor. The braking device is connected with the safety element, e.g., by a linkage. The braking device occupies a non-braking or release position in the release in the position of the safety element, which make the turning-on of the motor possible. When the safety element is in its safety position, the turning-on of the motor cannot be effected, and the braking device is in its braking position.

The above-described electric power tool is disclosed, e.g., in German Publication DE-A1-40 07 030. In the disclosed electric power tool, the braking device, which is mechanically connected with the safety element, is used for braking the working tool. The safety element has safety and release positions. In the release position of the safety element, the electric power tool motor can be turned on, and the braking device is deactuated, i.e., it occupies its non-braking position. In the safety position of the safety element, switching-on of the motor is not possible, and the braking device is actuated, i.e., it occupies its braking position. The braking device includes a braking member rotable about a rotational axis extending parallel to the power tool shaft. The braking member acts on braking drum mounted on the shaft. As a result of frictional forces, which act between the braking member and the braking drum, the motor and the working tool are braked. The actuation of the braking device is effected with an actuation member formed by a linkage including a plurality of articulated elements.

A drawback of the known electric power tool consists in that an inadvertent switching-on of the driving motor is still possible with the tool locking device still occupying its unlocking position.

An object of the invention is to provide means that would reliably prevent an inadvertent switching-on of the power tool motor and that could be reliably and simply actuated.

Another object of the invention is to provide means that would reliably prevent the switching-on of the power tool motor and that could be economically manufactured.

SUMMARY OF THE INVENTION

These and other objects of the present invention, which will become apparent hereinafter, are achieved by providing a locking mechanism displaceable between a release position, in which the safety element is retained in its safety position, and a locking position in which the safety element is in its release position.

The use of a locking mechanism for retaining the safety element in its safety or release positions permits to reliably prevent an erroneous manipulation of the safety element and the switch by a user during the operation of the braking device of the power tool. The operation is predetermined by the power tool itself. When the safety element in its safety position, the turning-on of the motor is impossible. With the tool locking device in its release position, the safety element becomes locked in its safety position by the locking mechanism. Only when the tool locking device occupies its locking position, the safety element is returned into its release position.

Preferably, both the locking mechanism and the locking device, which secures the working tool on the shaft, are actuated by a single locking lever, which insures simple and convenient operation by integration of two functions which can be performed with a single actuation element, the locking lever. A connection between the locking mechanism and the working tool locking device is provided in a simple manner with the use of a single actuation lever, the function of the release mechanism remains invisible to the user, and the use of a single lever facilitates handling of the power tool.

Advantageously, the locking mechanism has a locking member engageable in a groove provided in the braking device. The simple and cost-effective construction, from the manufacturing point of view, of the locking mechanism according to the present invention insures its advantageous application. However, dependent on particular features of an electrical power tool and its operation, other constructions of the locking mechanism can be contemplated.

Advantageously, the locking member is pivotally supported on a bolt which secures the locking member to the housing or housing component and provides for a pivotal movement of the locking member into the groove formed in the braking device.

Advantageously, the locking lever is provided with a control cam surface which serves for guiding the locking member, insuring stable control of the locking mechanism. The cam surface is so formed that it insures a positive guiding of the locking member. The use of a cam surface permits elimination of a spring for forcing the locking member out of the groove of the braking device. Also, the cam surface increases the durability of the entire structure. The cam surface advantageously is provided in the pivot region of the locking lever.

Further, advantageously, the cam surface is provided with a section that fixes the locking member in the locking position of the lever. Thereby, an undesired displacement of the locking member from its locking position into its release position is prevented. When the locking member is displaced from its locking position into its release position, the user becomes aware that the locking device, which secures the working tool on the shaft, is in its release position.

Advantageously, the locking mechanism is made of a plastic material, which insures its cost-effective manufacturing.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiments, when read with reference to the accompanying drawings.

DETAILED DESCRIPTION OF THE PREFERRED EMBODIMENT

Figure 1:
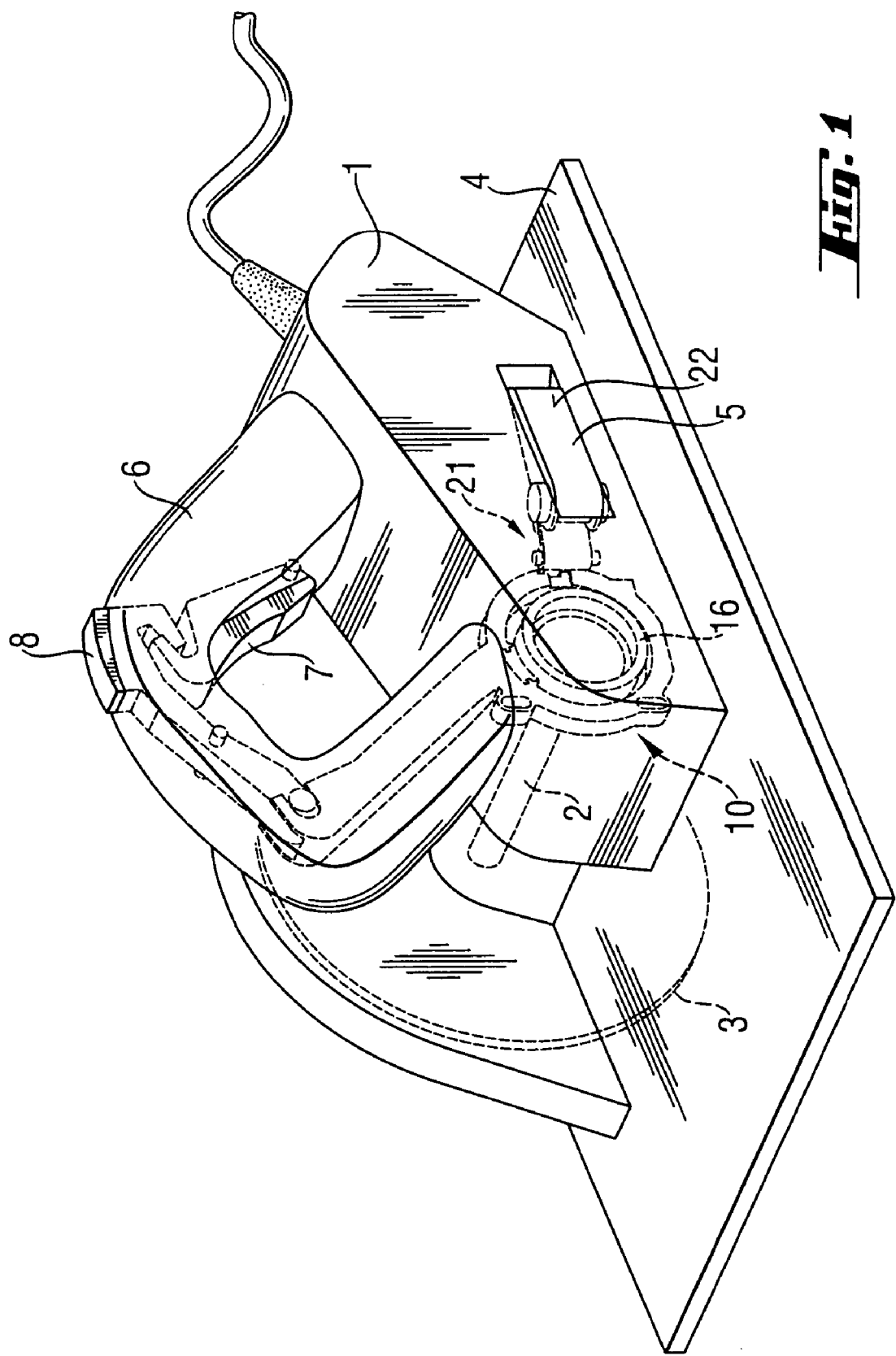
FIG. 1 a perspective view of an electrical power tool according to the present invention FIG. 2 a perspective view of a braking device for use with an inventive power tool.

An electrical power tool according to the present invention and, specifically, a circular saw, which is shown in FIG. 1, includes a housing 1 and a motor-driven shaft 2. The shaft 2 is releasably connected with a working tool 3 by a locking device 31 (shown in FIGS. 5a-5b). For actuating the locking device, a locking lever 5 is provided. The locking lever 5 is pivotally supported on the housing 1 for pivotal movement between locking and release positions. In the locking position of the locking lever 5, the working tool 3 is fixedly secured on the shaft 2 for joint rotation therewith. In the release position of the locking lever 5, the working tool 3 is not secured to the shaft 2 and can be easily removed.

A bearing plate 4 supports the electrical power tool for displacement along a surface. The working tool 3 extends through the bearing plate 4. The housing 1 is provided with a handle 6 with a switch 7 provided thereon for turning a driving motor (not shown) on and off, and a safety element 8 having safety and release positions.

Figure 2:
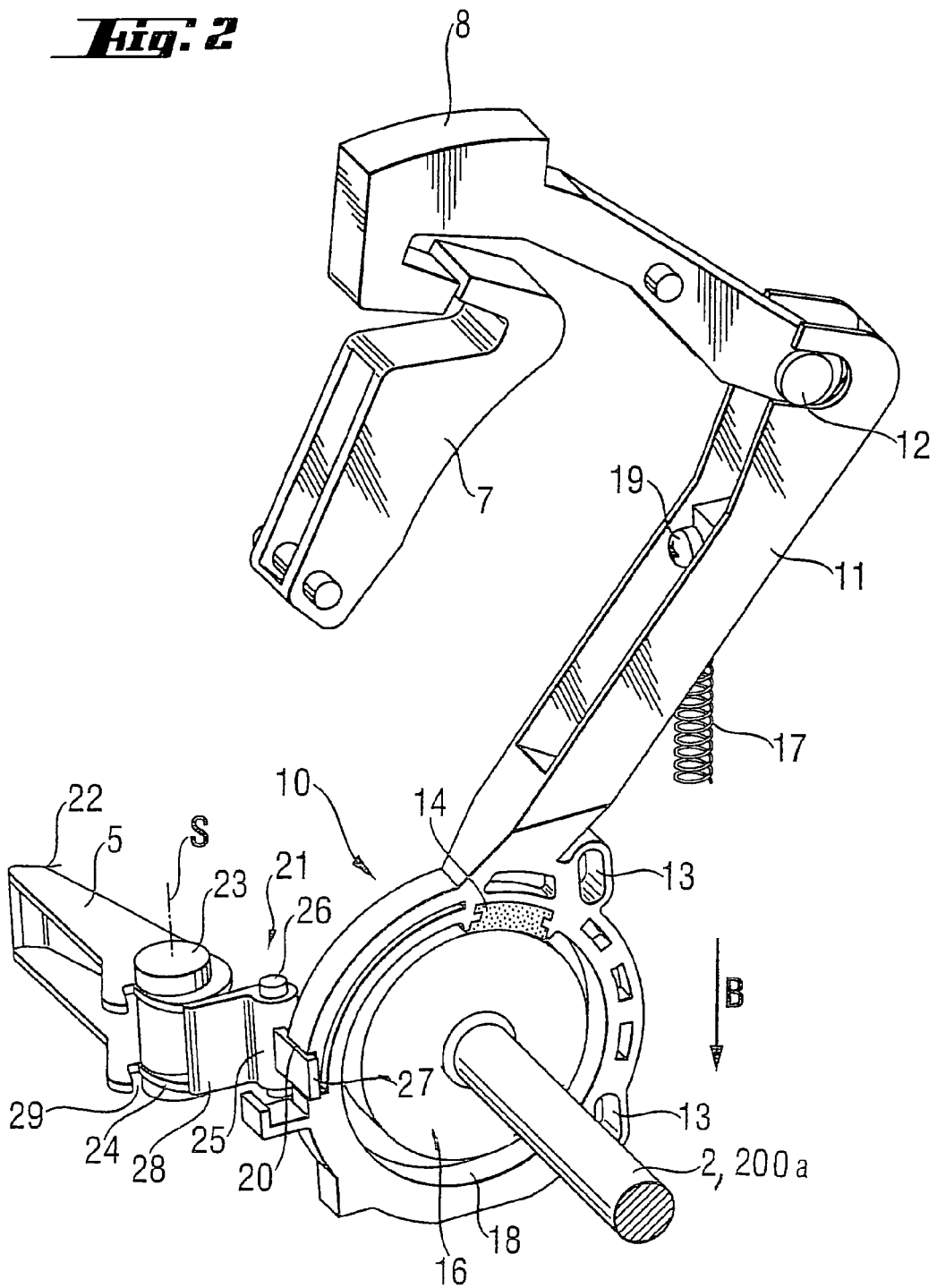

FIG. 2 shows a braking device 10 which is mechanically connected with the safety element 8, the shaft 2, and the switch 7. The safety element 8, and the switch 7 are connected with the braking device 10 by an actuation member 11 which forms an integral part of the braking device 10. A force acting on the safety element 8 is transmitted to the braking device via a plurality of articulated joints 12 and by the actuation member 11, causing a movement in a direction opposite to that indicated with arrow B. The braking device 10 has a plurality of openings 13 into which respective guide elements (not shown), which are secured on the housing 1, engage.

The braking device 10 has a braking member 14 which, upon movement in the direction indicated by arrow B or in the braking direction, contacts a braking drum 16 which is secured on the shaft 2. The resulting friction leads to braking of the rotational movement of the shaft 2. In the safety position of the safety element 8 as shown in FIG. 2, a spring 17, which is secured at one of its ends to the actuation member 11 with a screw 19 and is secured at it opposite end to the housing 1, pulls the actuation member 11 and, thereby the braking member 14 against the braking drum 16. Upon displacement of the safety element 8 into its release position, the braking member 14 is displaced against the biasing force of the spring 17 in the direction opposite the braking direction, i.e., in the direction opposite to that indicated with arrow B. In the release position of the braking device 10, the shaft 2 is not constrained and becomes freely rotatable. The shaft 2, together with the braking drum 16, is received in recess 18 provided in the braking device 10. In the region of the recess 18 and of the shaft 2, a groove 20, which extends substantially parallel to the shaft 2, is provided on the braking device 10.

Figure 3:
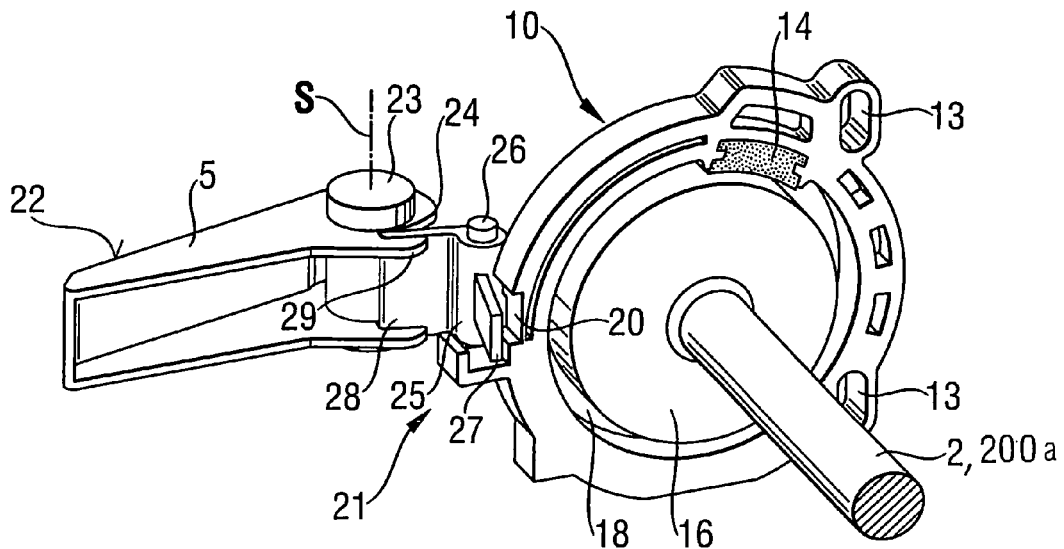
FIG. 3 a side view of a locking mechanism, a braking device, and a locking lever in a locking position.
Figure 4:
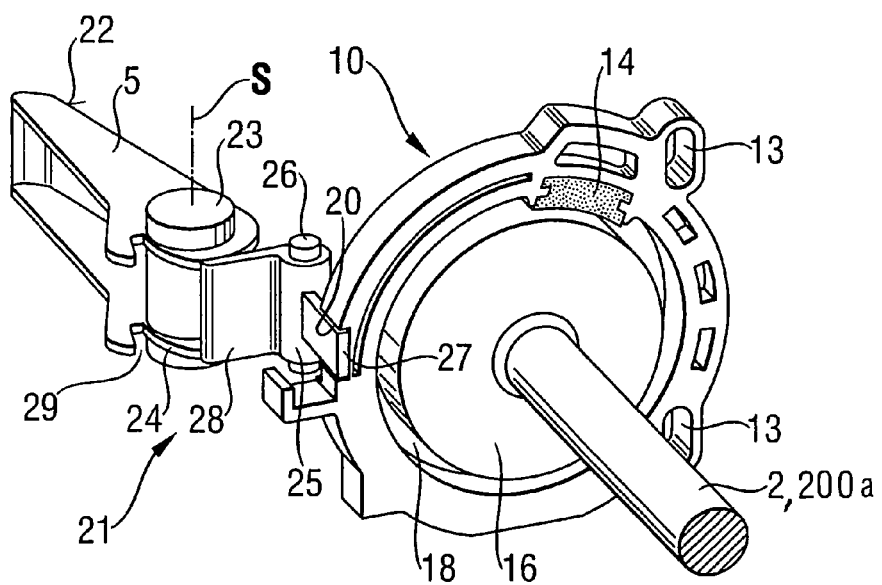
FIG. 4 a side view of a locking mechanism, a braking device, and a locking lever in a release position.

FIGS. 3-4 show a portion of the braking device 10 with the groove 20, the locking lever 5, the shaft 2, and the locking mechanism generally designated with a reference numeral 21.

The locking lever 5 has, at one of its end, a holding portion 22 and at an opposite end, a cylindrical guide member 23. The guide member 23 is received in two bores provided in the housing 1 for pivotal movement about a pivot axis S. The locking mechanism 21 has a locking member 25 which engages two cams 24 which extend around the guide member 23 transverse to the pivot axis S. The locking member 25 is pivotally connected with the housing 1 by a bolt 26 that extends parallel to the pivotal axis S. The locking member 25 has a locking arm 27 is displaced, upon a pivotal movement of the locking lever 5, between its locking position which is shown in FIG. 3 and which corresponds to the locking position of the tool locking device 31, and its release position which is shown in FIG. 4 and which corresponds to the unlocking position of the tool locking device 31.

In its release position, the locking arm 27 extends into groove 20. The locking arm 27 occupies this position when the safety element 8 is in the safety position. The formlocking engagement of the locking arm 27 in the groove 20 retains the braking device 10 in its braking position. Upon pivotal movement of the locking lever 5 into its locking position, the locking arm 27 moves out of the groove 20, and the interlocking position between the braking device 10 and the locking element 25 or housing 1 is broken. As the safety element 8 is connected rigidly with the braking device 10 by the actuation member 11, the release of the braking device 10 results in the release of the safety element 8, so that the switch 7 becomes operable.

In order to prevent an inadvertent displacement of the locking lever 5 from its locking position shown in FIG. 3 into its release position shown in FIG. 4, the cam 24 has a stop section 29.

The locking mechanism 21 is formed of a plastic material by an injection molding process.

Figure 5A:
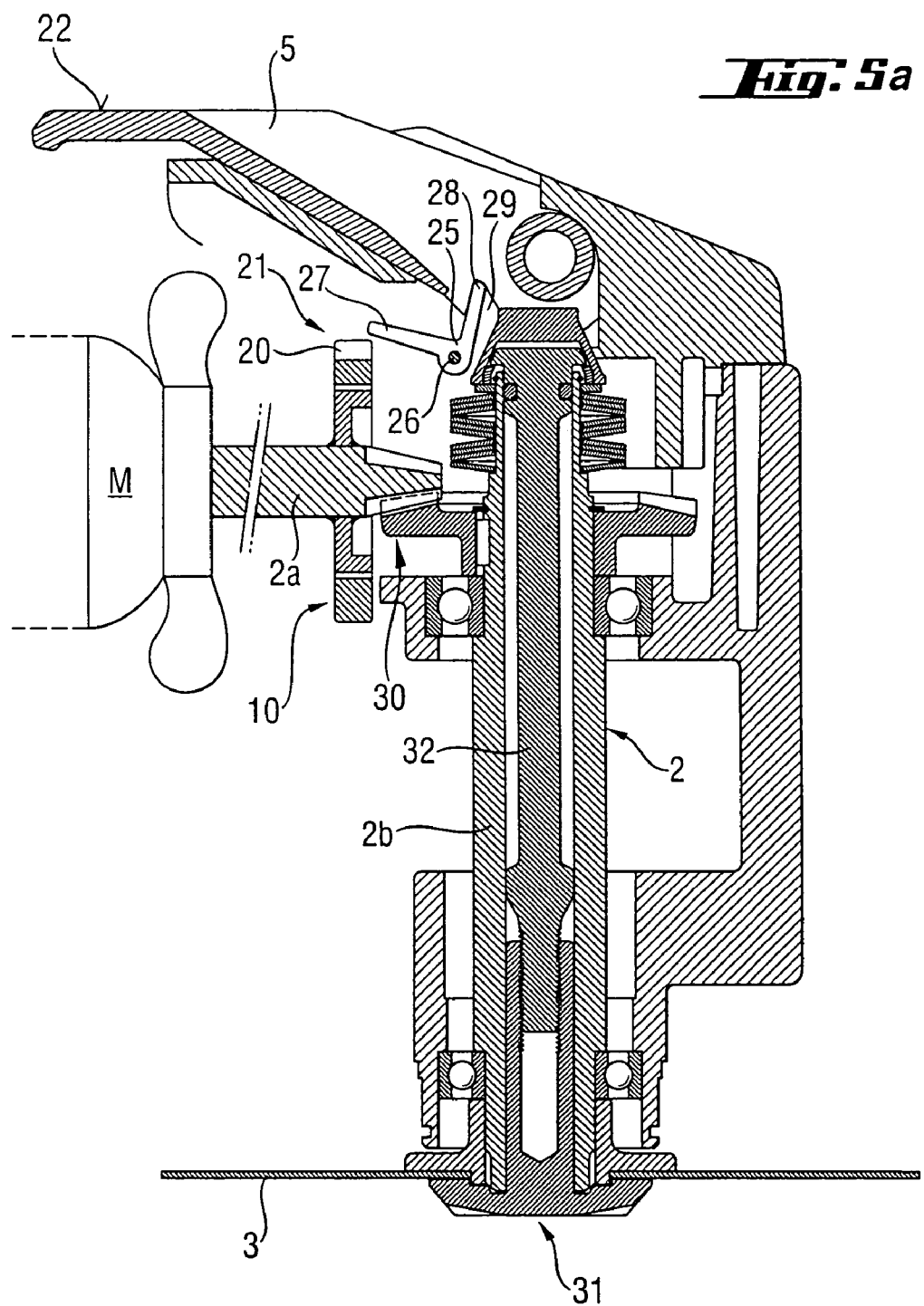
FIG. 5a a cross-sectional view of a locking mechanism together with a braking device and a locking device, for a two sectional shaft in a locking position of the locking device.
Figure 5B:
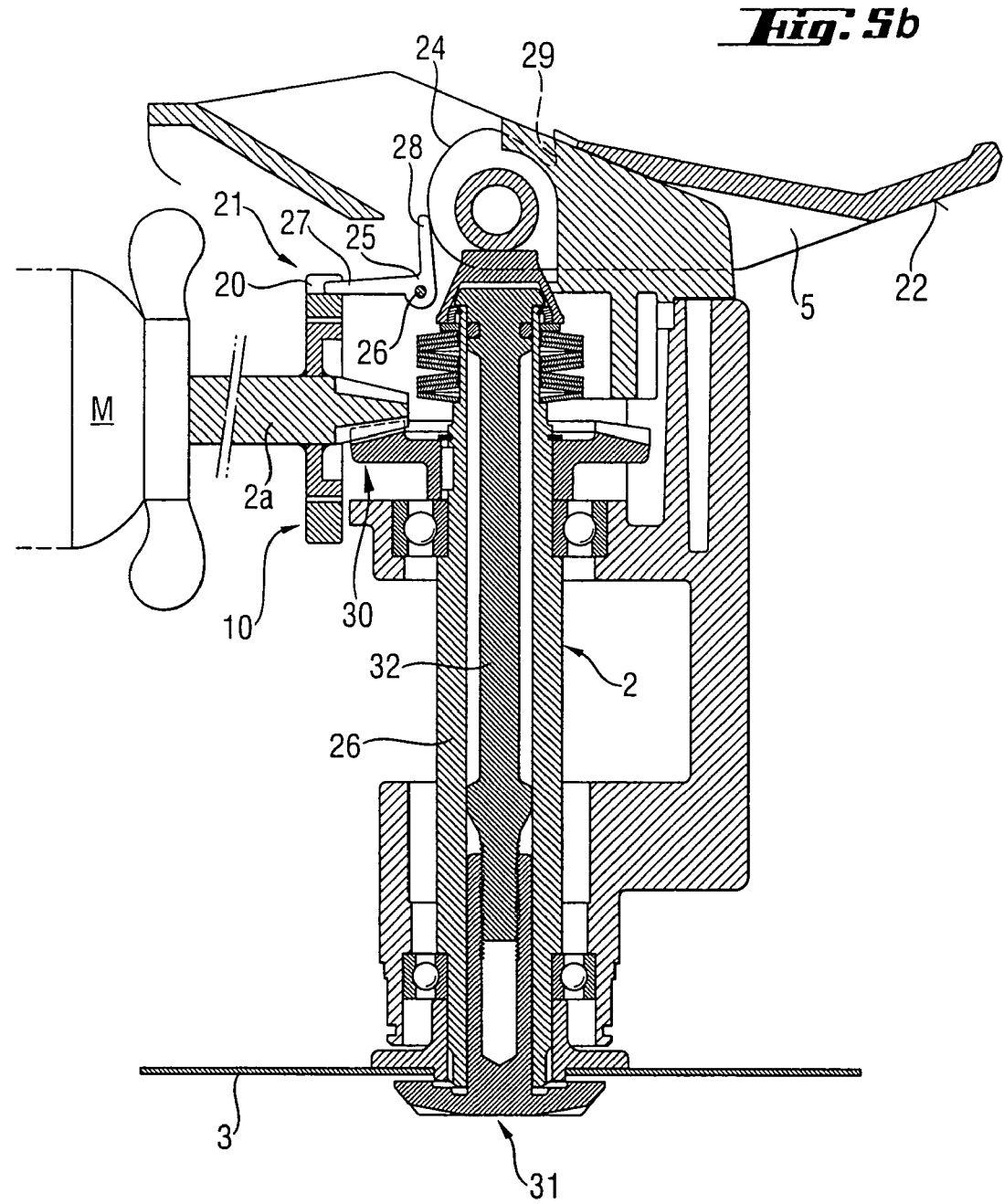
FIG. 5b a cross-sectional view similar to that of FIG. 5a but in a release position of the locking device.

FIGS. 5a-5b shown an advantageous embodiment o the inventive power tool with a two-sectional shaft 200. The shaft 200 is formed of a first section 200 a connected with the drive motor M and a second section 200b connectable with the working tool 3. The first and second sections 200a and 200b are connected with each other by a gear unit 30. The locking device 31 for connecting the second section 200b with the working tool 3 is provided at an end of the second section 200b remote from the gear unit 30. The locking device 31 is displaced between its locking position, in which the working tool is fixedly secured on the second section 200b with a spring-biased tension rod 32 (FIG. 5a), and its release position, in which the working tool 3 can be mounted on or dismounted from the second section 200b (shown in FIG. 5b) upon pivotal movement of the locking lever 5 between its locking and release positions as it has been described above.

Though the present invention was shown and described with references to the preferred embodiment, such are merely illustrative of the present invention and are not to be construed as a limitation thereof, and various modifications of the present invention will be apparent to those skilled in the art. It is therefore, not intended that the present invention be limited to the disclosed embodiment or details thereof, and the present invention includes all variations and/or alternative embodiments within the spirit and scope of the present invention as defined by the appended claims.

What is claimed is:

1. An electrical power tool, comprising:

a motor-driven shaft means (200) for supporting a circular working tool (3);

a motor (M) that drives the shaft means (200);

tool locking means (31) for securing the circular working tool (3) on the shaft means (200) and having a locking position in which the circular working tool (3) is fixedly secured on the shaft means (200), and an unlocking position in which the circular working tool (3) can be removed from the shaft means (200);

a switch (7) operably connected with the shaft-driving motor for turning the motor on and off;

a braking device (10) for braking the shaft means (200) and having a braking position in which it brakes rotation of the shaft means (200), and a release position in which the shaft means (200) can freely rotate;

a safety element (8) connected with the braking device (10) and cooperating with the switch (7), the safety element (8) having a safety position that corresponds to the braking position of the braking device (10), wherein the safety position is a position relative to the switch (7) in which the switch cannot turn-on the shaft-driving motor (M), the safety element (8) further having a release position that corresponds to the release position of the braking device (10), wherein the release position of the safety element (8) is a position relative to the switch (7) in which the switch (7) can turn-on the shaft-driving motor (M);

a locking mechanism (21) connectable with the braking device (10) and the tool locking means (31) and displaceable between a locked position, in which the tool locking means (31) is in its unlocking position and the braking device (10) is in its braking position and in which the safety element (8) is retained in the safety position thereof, and an unlocked position, in which the tool locking means (31) is in its locking position and the braking device (10) is in its release position and in which the safety element (8) occupies the release position thereof;

a locking lever (5) for actuating both the tool locking means (31) and the locking mechanism (21) and displaceable between a lever locking position that corresponds to the locking position of the tool locking means (31) and the unlocked position of the locking mechanism (21), and a lever release position that corresponds to the unlocking position of the tool locking means (31) and the locked position of the locking mechanism (21), whereby when the tool locking means (31) is in the unlocking position, the shaft means (200) is braked and the switch (7) is prevented from turning-on the shaft-driving motor, and when the tool locking means (31) is in the locking position, the shaft means (200) can freely rotate and the switch (7) can actuate the shaft-driving motor (M), wherein the braking device (10) includes a braking member for braking the shaft means in the braking position, the breaking device further including a groove (20) therein, and the locking mechanism (21) has a locking member (25) engaging in the groove (20) of the braking device (10) in the lever release position of the locking lever (5) for retaining the braking device (10) in the braking position thereof, the locking member being removed from within the groove (20) of the braking device (10) in the lever locking position.

2. An electrical power tool according to claim 1, the locking mechanism further comprising a bolt (26) for pivotally supporting the locking member (25) for pivotal movement between engaging and disengaging positions.

3. An electrical power tool according to claim 1, wherein the locking lever (5) has cam means (24) engaging the locking member (25) for guiding the locking member (25) between an engaging position of the locking member (25) and a disengaging position thereof corresponding to the release position of the braking device (10).

4. An electrical power tool according to claim 3, wherein the cam means (24) has a section engagable with the locking member (25) for retaining the locking member (25) in the engaging position thereof.

5. An electrical power tool according to claim 1, wherein the locking mechanism is formed of a plastic material.

6. An electrical power tool according to claim 1, further comprising means (11) for mechanically connecting the safety element (8) with the braking device (10).

7. An electrical power tool according to claim 1, wherein the motor-driven shaft means (200) is formed of a first section (200a) connected with the shaft-driving motor (M), and a second section (200b) connectable with the working tool (3), and wherein the power tool further comprises gear means (30) for connecting the first (200a) and second (200b) sections, the tool locking means (31) being provided at an end of the second section (200b) remote from the gear means (30).

8. An electrical power tool according to claim 1, wherein the tool locking means (31) comprises a tension rod (32) for connecting the tool locking means (31) with the locking lever (5).

* * * * *